US012697672B2

(12) United States Patent
Guillermit et al.

(10) Patent No.: US 12,697,672 B2
(45) Date of Patent: Aug. 4, 2026

(54) WELDING ASSISTANCE METHOD FOR A ROBOT DEVICE

(71) Applicant: WEEZ-U WELDING, Nantes (FR)

(72) Inventors: Yves Guillermit, Nantes (FR); Benoit Tavernier, La Baule (FR)

(73) Assignee: WEEZ-U WELDING, Nantes (FR)

( * ) Notice: Subject to any disclaimer, the term of this patent is extended or adjusted under 35 U.S.C. 154(b) by 769 days.

(21) Appl. No.: 18/024,764

(22) PCT Filed: Aug. 31, 2021

(86) PCT No.: PCT/EP2021/074023
§ 371 (c)(1),
(2) Date: Mar. 5, 2023

(87) PCT Pub. No.: WO2022/053354
PCT Pub. Date: Mar. 17, 2022

(65) Prior Publication Data
US 2023/0356316 A1     Nov. 9, 2023

(30) Foreign Application Priority Data

Sep. 8, 2020    (FR) ...................................... 2009076

(51) Int. Cl.
B23K 9/095          (2006.01)
B23K 9/10           (2006.01)
(Continued)

(52) U.S. Cl.
CPC ............ B23K 9/095 (2013.01); B23K 9/1087 (2013.01); B23K 9/127 (2013.01); G05B 19/19 (2013.01);
(Continued)

(58) Field of Classification Search
None
See application file for complete search history.

(56) References Cited

U.S. PATENT DOCUMENTS 5,065,329 A * 11/1991 Yamazaki ............ G05B 19/409
700/166
2018/0101166 A1* 4/2018 Aldridge ................ B25J 9/1671
(Continued)

FOREIGN PATENT DOCUMENTS

CN          111069740 A  *  4/2020  ............. B23K 9/127
CN          111152221 A     5/2020
(Continued)

OTHER PUBLICATIONS

CN 111069740 A (Zhou, Kun et al.) Apr. 28, 2020 [retrieved on Dec. 27, 2025]. Retrieved from Foreign Image and Text database, translation by Clarivate Analytics. (Year: 2020).*
(Continued)

*Primary Examiner* — John J Norton
(74) *Attorney, Agent, or Firm* — H&I PARTNERS; Chai Im; C. Andrew Im

(57) ABSTRACT

A method for welding together two parts along a weld line using a welding system enabling an operator to remotely perform welding operations. The operator defines reference points on the parts to be welded and/or on the weld line to be followed. A general movement direction of the welding torch is defined from the reference points. A local frame of reference is defined relative to the general movement direction of the welding torch. The welding torch is automatically moved from a welding starting point in the general movement direction. A flow of movement instructions linked to actions of the operator on the human-machine interface is generated to move the welding torch away from the general movement direction to adapt a trajectory of the welding torch to an actual shape of the weld line. The welding torch is moved corresponding to the flow of instructions generated by the human-machine interface.

19 Claims, 6 Drawing Sheets

(51) Int. Cl.
   *B23K 9/127*          (2006.01)
   *G05B 19/19*          (2006.01)
   *G05B 19/409*         (2006.01)

(52) U.S. Cl.
   CPC .. *G05B 19/409* (2013.01); *G05B 2219/45135*
                                  (2013.01)

(56)                    References Cited

U.S. PATENT DOCUMENTS

2019/0160583 A1 *   5/2019   Matthews ............. B23K 31/003
2020/0101607 A1 *   4/2020   Matsushima .......... G05B 19/42
2020/0368904 A1 *  11/2020   Aldridge .............. B23K 9/0953

FOREIGN PATENT DOCUMENTS

EP          0517220  B1    3/1997
EP          0842725  B1    3/2004

OTHER PUBLICATIONS

Robotiq, "Teaching Robot Welder with External Axis", Sep. 11, 2014, pp. 1-2, Retrieved from the Internet: https://www.youtube.com/watch?v=MO_RiMgM9Gc.

* cited by examiner

WELDING ASSISTANCE METHOD FOR A ROBOT DEVICE

RELATED APPLICATIONS

This application is a § 371 application of PCT/EP2021/074023 filed Aug. 31, 2021, which claims priority from French Patent Application No. 2009076 filed Sep. 8, 2020.

FIELD OF THE INVENTION

The present invention relates to a welding assistance method for a robotic device.

BACKGROUND OF THE INVENTION

In a manner known per se, welding consists of mechanically linking two metal parts by supplying heat and possibly material. Heat makes it possible to temporarily reach the melting temperature of metals. When cooling, the metals join the parts together.

There are many metal welding processes (MIG (for "Metal Inert Gas"), MAG (for "Metal Active Gas"), TIG (for "Tungsten Inert Gas"), Laser, Hybrid, under flux, or other) and depend on three main characteristics:

the means of heat supply: fusible electrode (MIG, MAG), infusible electrode (TIG), Laser, or other, the type of material supply: wire together with heat (MIG, MAG), rod separated from heat supply (TIG), no material supply, and the type of welding protection: a transient melting period makes the metals sensitive to pollution so that the weld bath must be protected (inert gas, active gas, flux).

Whatever the process used, it is extremely dynamic and its precise modeling is not mastered. However, two main constraints are known, namely:

a high level of geometric precision: the point of impact of the heat supply must be adjusted with a precision of the order of a tenth of a millimeter, and a high reactivity to welding uncertainties: when an uncertainty occurs, the available reaction time is very short, around a tenth of a second.

These constraints as well as exposure to heat, welding fumes and painful postures make the welder job difficult.

In order to remedy the difficulty of the job, it is possible to automate the welding process using welding robots. For example, in the automobile field, it is known to use stationary robots in front of which vehicles pass at a regular rate. The robots then deploy their arms to predetermined positions and deliver a predetermined heat supply to perform a weld.

Alternatively, the parts are presented in front of a robotic arm in an optimal position by a positioner and the welding sequences are predetermined. The welding positions are limited to those where the gravity acting on the bath contributes to the stabilization thereof (position PA or PB according to standard EN 287-1).

However, it is not possible to automate welding for large, unique, and complex parts, which would require many hours of unprofitable programming for a single weld.

In addition, the specific characteristics of certain assemblies, such as variable clearances, lead to a too complex behavior of the weld bath for an automatic system to perform the weld flawlessly.

There is therefore a need for a welding robot relieving the posture of the welder and allowing an experienced human operator to adjust the weld bath in real time in response to observing the evolution of the weld.

OBJECT AND SUMMARY OF THE INVENTION

The invention aims to efficiently meet this need by proposing a method for assisting welding between two parts along a weld line using a welding system allowing an operator to carry out welding operations remotely, said welding system comprising:

a robotic device carrying a welding torch, said robotic device being associated with a robot marker, a man-machine interface able to generate instructions for moving the robotic device, and a control system able to receive movement instructions from the man-machine interface and to control the robotic device according to the movement instructions received via a communication link, characterized in that said welding assistance method comprises:

a step of defining through the operator reference points on the parts to be welded and/or on the weld line to be followed, a step of defining a general direction of movement of the welding torch from the reference points, a step of defining a local coordinate frame relative to the general direction of movement of the welding torch, a step of automatically moving the welding torch from a welding initial point in the general direction of movement, a step of generating a flow of movement instructions linked to actions of the operator on the man-machine interface for moving the welding torch away from the general direction of movement so as to adapt in real time a trajectory of the welding torch to a real shape of the weld line, a step of processing, through the control system, the flow of movement instructions generated by the man-machine interface in order to deduce therefrom a desired speed vector or a desired position in the local coordinate frame, and a step of effectively moving the torch corresponding to the desired speed vector or to the desired position in the local coordinate frame.

According to an implementation of the invention, to ensure the effective movement of the torch, said method further comprises:

a step of transposing the desired speed vector or the desired position in the robot coordinate frame, a step of determining, from coordinates of the desired speed vector or the desired position in the robot coordinate frame, joint coordinates of the robotic device, and a step of effectively moving the welding torch along the previously determined joint coordinates corresponding to the flow of instructions generated by the man-machine interface. This step typically uses automatic control logic.

The invention thus makes it possible to assist the welder by implementing a remote operation allowing the welder to be freed from the painful constraints of the welding operation. The invention also allows the operator to detect and react to welding uncertainties while having great freedom in the welding trajectory which is not imposed by the system.

According to one implementation of the invention, the general direction of movement is a direction having a shape chosen in particular from: a straight line, a circle or a portion of a circle, an oval shape or a portion of an oval shape, a polygon or a portion of a polygon, an intersection of two cylinders or an intersection portion of two cylinders, or any 2D or 3D curve.

According to one implementation of the invention, said method comprises a prior step of adjustment according to which, following the definition of reference points consisting of a welding initial point and a welding end point and of the general direction of movement of the welding torch, said welding torch moves from a clearance point located near the welding end point to a clearance point located near the welding initial point to ensure that there is no interference between the welding torch and its environment in order to perform the welding process.

According to an implementation of the invention, after having globally defined a welding initial point and a welding end point, and validated a trajectory by a return path, the operator can carry out a fine adjustment of the initial position.

According to one implementation of the invention, a latency period between an actuation of the man-machine interface by the operator and an effective movement of the welding torch is less than 450 ms.

According to one implementation of the invention, the local coordinate frame comprises an XI-axis coinciding with the general direction of movement of the welding torch, a Zl-axis corresponding to a projection of a direction of orientation of the welding torch in a plane perpendicular to the Xl-axis, and a Yl-axis perpendicular to the plane defined by the Xl-axis and the Zl-axis.

According to an implementation of the invention, in the case of a curved weld line, the local coordinate frame can evolve along the weld line, in such a way that the axis remains tangent to the weld line.

Alternatively, the local coordinate frame could be defined relative to the parts to be welded.

According to one implementation of the invention, an automatic movement along the Xl-axis being imposed by the robotic device, the operator can adjust a movement of the welding torch via the man-machine interface, only along the Yl-axis and/or the Zl-axis.

According to an implementation of the invention, said method further comprises the step of adapting a speed of movement of the welding torch along the Xl-axis via the man-machine interface.

According to an implementation of the invention, the speed of movement is comprised between a minimum value and a maximum value.

According to an implementation of the invention, said method includes a step of adjusting an angular orientation of the welding torch with respect to the weld line.

According to one implementation of the invention, the welding system further comprises a camera, and a monitor displaying an image of the weld line and of the welding torch captured by the camera.

According to an implementation of the invention, an axis of the camera coincides with the general direction of movement so that an image displayed by the monitor is in the Yl/Zl-plane.

According to an implementation of the invention, said method comprises a step of establishing a communication with a welding generator for modifying welding parameters from the man-machine interface and displaying these welding parameters on the man-machine interface.

According to one implementation of the invention, continuous pressing of a safety button of the man-machine interface is imposed during a phase of performing a weld by the robotic device.

According to one implementation of the invention, continuous pressing of a safety button of the man-machine interface is imposed during an adjustment phase consisting in defining the reference points.

According to one implementation of the invention, the robotic device comprises several actuators mechanically mounted in series relative to each other.

According to one implementation of the invention, the robotic device comprises several actuators mechanically mounted in parallel with respect to each other.

According to one implementation of the invention, the robotic device comprises a structure made of a lightweight material, in particular aluminum or a composite material.

According to one implementation of the invention, the robotic device comprises a base provided with removable holding means for fixing the robotic device on or near the parts to be welded.

BRIEF DESCRIPTION OF THE DRAWINGS

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein.

It should be noted that, in the figures, the structural and/or functional elements common to the different embodiments may have the same references. Thus, unless otherwise stated, such elements have identical structural, dimensional and material properties.

DETAILED DESCRIPTION OF THE EMBODIMENTS

Figure 1:
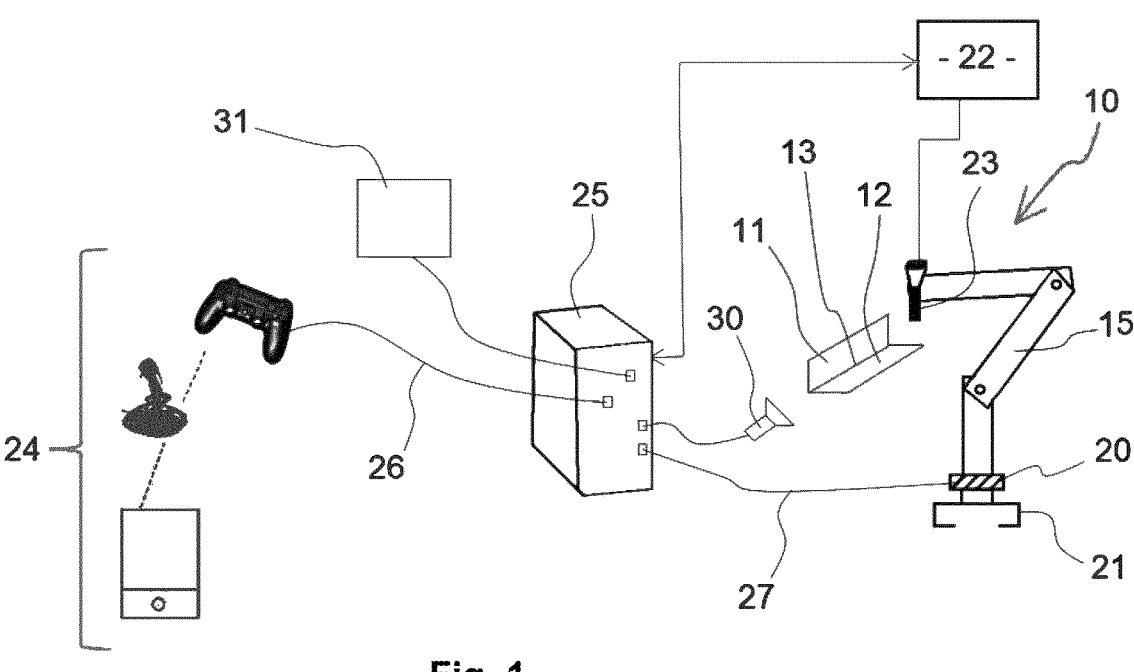
FIG. 1 is a schematic representation of a welding system according to the present invention.

FIG. 1 shows a welding system 10 allowing an operator to perform welding operations remotely between two parts 11, 12 along a weld line 13.

To this end, the welding system 10 comprises a robotic device 15 which can take the form of a robotic arm or a Cartesian robot or any other device equipped with actuators capable of moving a welding torch to perform a welding operation. The actuators of the robotic device 15 may be mechanically mounted in series or in parallel with each other.

Figure 2:
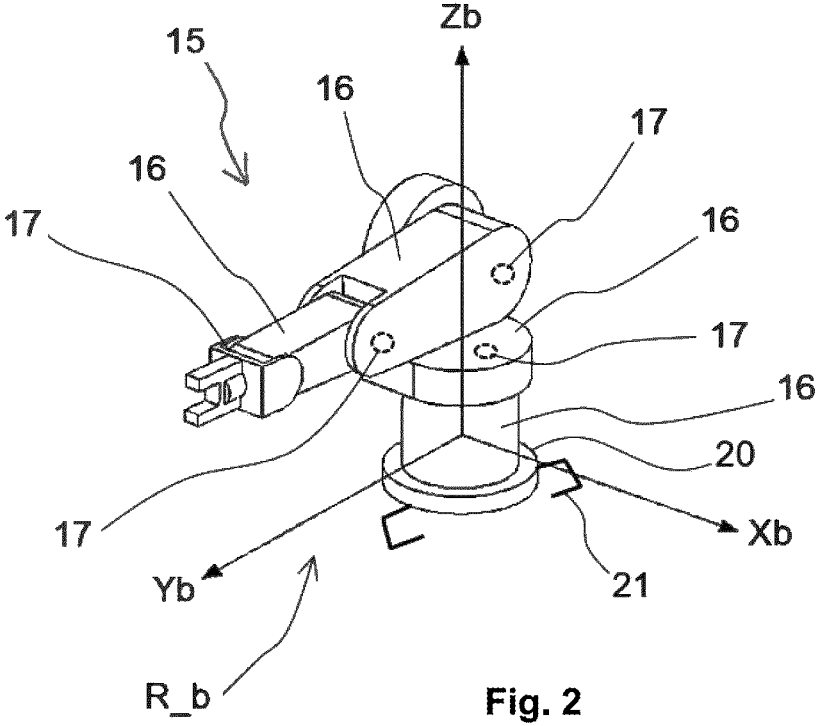
FIG. 2 shows a perspective view of a robotic arm with which is associated a spatial coordinate frame, said robot coordinate frame.

The invention is described in the context of the use of a robotic arm 15 shown in FIG. 2 provided with several parts 16 movable in rotation relative to each other via joints 17, for example taking the form of pivot links or ball joints. Actuators are arranged at the joints 17 to allow movement of the robotic arm 15 in the three dimensions of space.

The robotic arm 15 is associated with a robot coordinate frame R_b having Xb, Yb, Zb axis. The robot coordinate frame R_b is in particular associated with the base 20 of the arm 15 as shown in FIG. 2. The base 20 of the arm 15 is intended to be fixed during the welding operation. For this purpose, the base 20 comprises removable holding means 21, such as clamps, a clamping system, or any other system suitable for fixing the robotic arm 15 on or near the parts 11, 12 to be welded.

Advantageously, in order to facilitate its transport close to the parts 11, 12 to be welded, the robotic arm 15 comprises a structure made of a lightweight material, in particular aluminum or a composite material. The weight of the robotic arm 15 is preferably less than 10 kg.

The robotic arm 15 carries at its end a welding torch 23 which can for example ensure a welding process with addition of material of the MIG type (for "Metal Inert Gas") or of the MAG type (for "Metal Active Gas"). Alternatively, a TIG type (Tungsten Inert Gas) torch can be used with or without addition of material, a laser torch, or any other torch suitable for the application. The welding torch 23 is associated with a welding generator 22. The welding parameters as well as the starting and stopping of the welding generator 22 can be controlled via the sending of instructions by the control system 25 to said welding generator 22.

A man-machine interface 24 is able to generate a flow of instructions for moving the robotic arm 15 corresponding to the actions of an operator. The man-machine interface 24 can thus generate instructions reflecting the actions of the human operator in real time. The man-machine interface 24 may take the form of a digital tablet, a joystick, a controller, a mouse, a trackball, a keyboard, or any other control means suitable for the application.

A control system 25 is able to receive the flow of movement instructions from the man-machine interface 24 and to control the robotic arm 15 according to the flow of movement instructions received. The control system 25 may in particular take the form of a computer or a server. The control system 25 may comprise two stages, namely a first stage ensuring the management of the local coordinate frame R_loc and the interpretation of the instructions issued from the man-machine interface 24 and a second stage ensuring the management of the joint transform and the enslavement of the actuators of the robotic arm 15. These two stages can each be associated with a separate control unit or be integrated into the same control unit. In other words, the control system 25 may be composed of a single control unit implementing the two stages of said control system or of two control units each implementing a separate stage of said control system.

The man-machine interface 24 is connected to the control system 25 via a communication link 26 of the wired type, for example a USB type link. As a variant, the communication link 26 between the control system 25 and the man-machine interface 24 is a wireless link, in particular of the radio-frequency type, such as for example a link of the WIFI or Bluetooth type. Alternatively, the control system 25 could be physically embedded in the man-machine interface 24.

Furthermore, the robotic arm 15 is connected to the control system 25 via a communication link 27 of the wired type, for example of the Ethernet type. As a variant, the communication link 27 between the control system 25 and the robotic arm 15 is a wireless link, in particular of the radio-frequency type, such as for example a WIFI or Bluetooth type link.

Preferably, the system 10 further comprises a camera 30 placed close to the weld line 13 to be followed, and a monitor 31 displaying an image of the weld line 13 and of the welding torch 23 captured by the camera. 30. The presence of the camera 30 and the monitor 31 is however not essential for the implementation of the process as the evolution of the weld can be visually monitored by the operator without a camera system.

Figure 3:
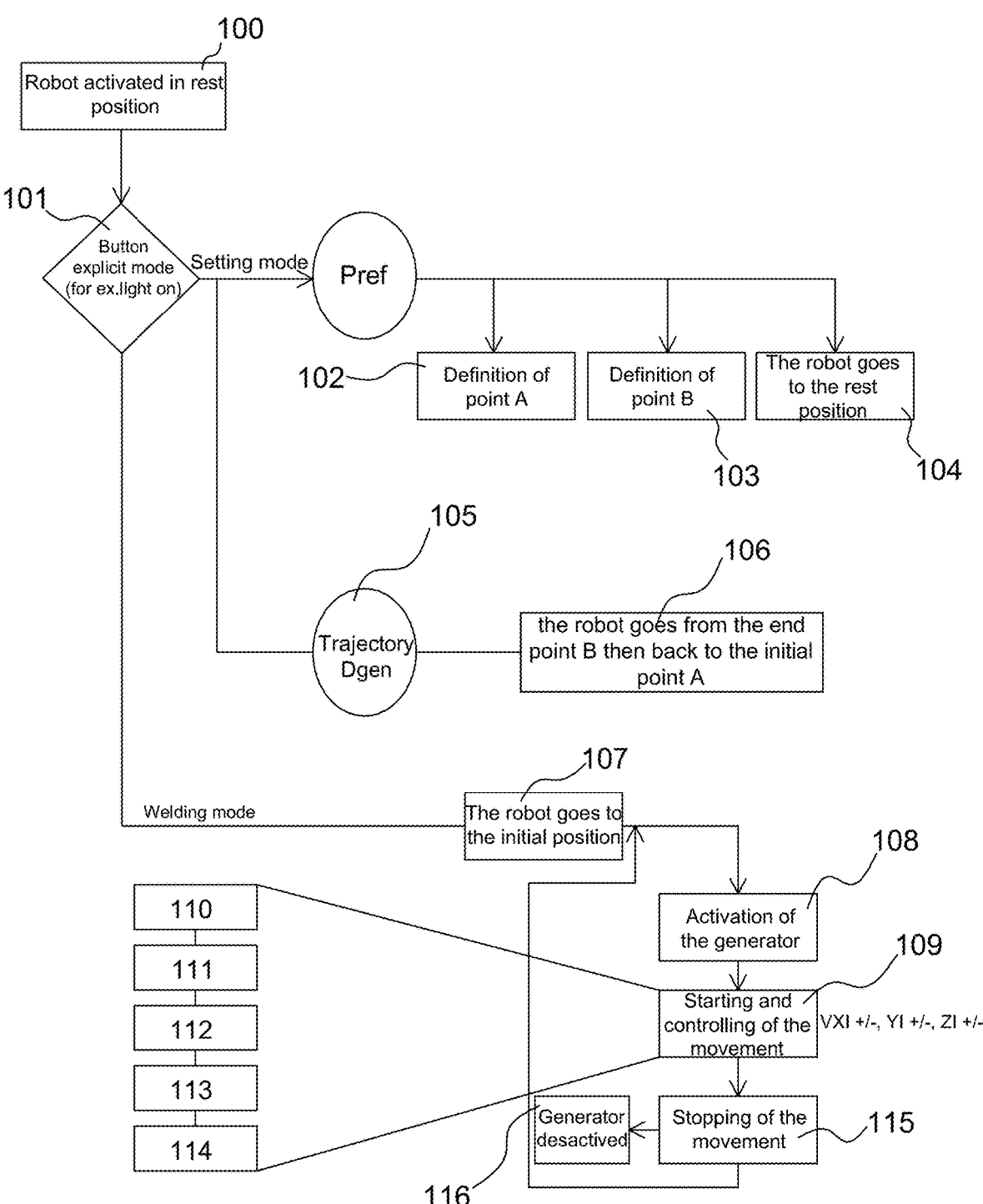
FIG. 3 shows a functional diagram of the steps of the welding method according to the present invention.
Figure 4:
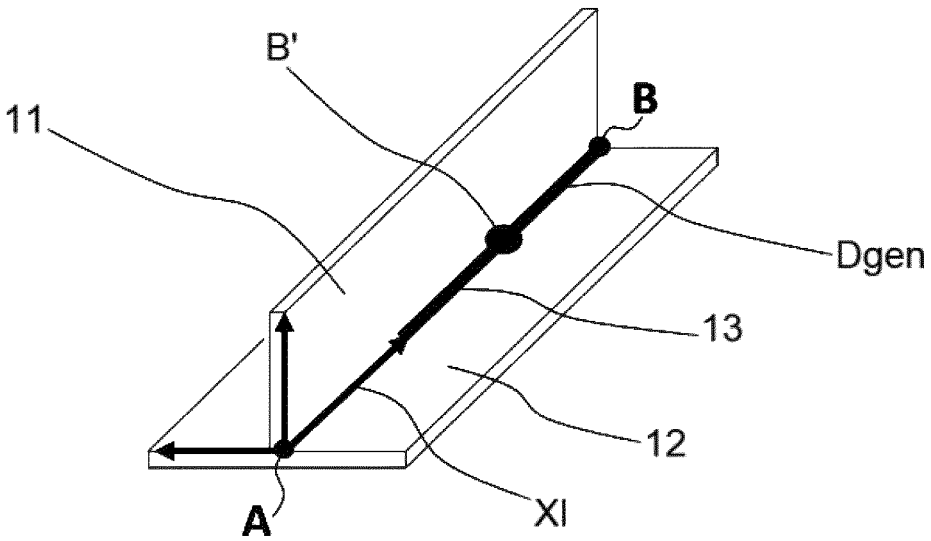
FIG. 4 is a perspective view of two flat parts to be welded by means of the method according to the present invention.

It is described below, with reference to FIG. 3, an example of implementation of the welding method according to the invention between two parts 11 and 12 forming two planes inclined with respect to each other. The intersection of the two parts 11, 12 constitutes a weld line 13 to be followed in a rectilinear shape (cf. FIG. 4). However, as explained in more detail below, the weld line 13 may have any shape. The example of the straight line is given to facilitate understanding of the invention.

In a step 100, the robotic arm 15 put into operation is in a rest position corresponding to a default position in which the actuators are activated so as to compensate for the weight of the robotic arm 15.

In a step 101, the operator selects a "setting mode" during which the operator defines, using the robotic arm 15, reference points Pref located on the weld line 13. The reference points Pref are for example constituted by a welding initial point A and a welding end point B. Intermediate points can also be defined. End point B can only be used to define the general direction of the weld. The operator can, if necessary, authorize a movement of the welding torch 23 beyond point B.

To this end, in a step 102, the operator manually moves the robotic arm 15 so as to position the welding torch 23 at the welding initial point A and validates this point via the man-machine interface 24. In a step 103, the operator manually moves the robotic arm 15 so as to position the welding torch 23 at the welding end point B and validates this point via the man-machine interface 24. At the end of the selection, the robotic arm 15 returns to the rest position in a step 104. Alternatively, it would however be possible to define an intermediate point B' not necessarily corresponding to the welding end point, i.e. at the end of the weld line.

The control system 25 determines in a step 105 a general direction of movement Dgen of the welding torch 23 from the previously selected reference points Pref. The general direction of movement Dgen is automatically generated by the system without any operator intervention. In this case, the general direction of movement Dgen passes through the reference points A and B. The general direction of movement Dgen is thus a direction which globally follows the weld line 13 without taking into account the local irregularities of said weld line 13.

In a step 106, the welding torch 23 is moved by the robotic arm 15 without being activated from the end point B to the initial point A in the general direction of movement Dgen to ensure that there is no interference between the welding torch 23 and the environment thereof. During this procedure, clearance points near the initial and end points may be used to avoid any collision with the part. After having globally defined a welding initial point and a welding end point, and validated a trajectory along a return path, the operator can carry out a fine adjustment of the initial position if necessary.

In order to carry out the definition of the reference points Pref as well as the verification of the trajectory, it is preferably imposed that a button of the man-machine interface 24 be kept pressed for safety reasons. This ensures that any movement of the robotic arm 15 is performed in the presence of an operator.

Figure 5:
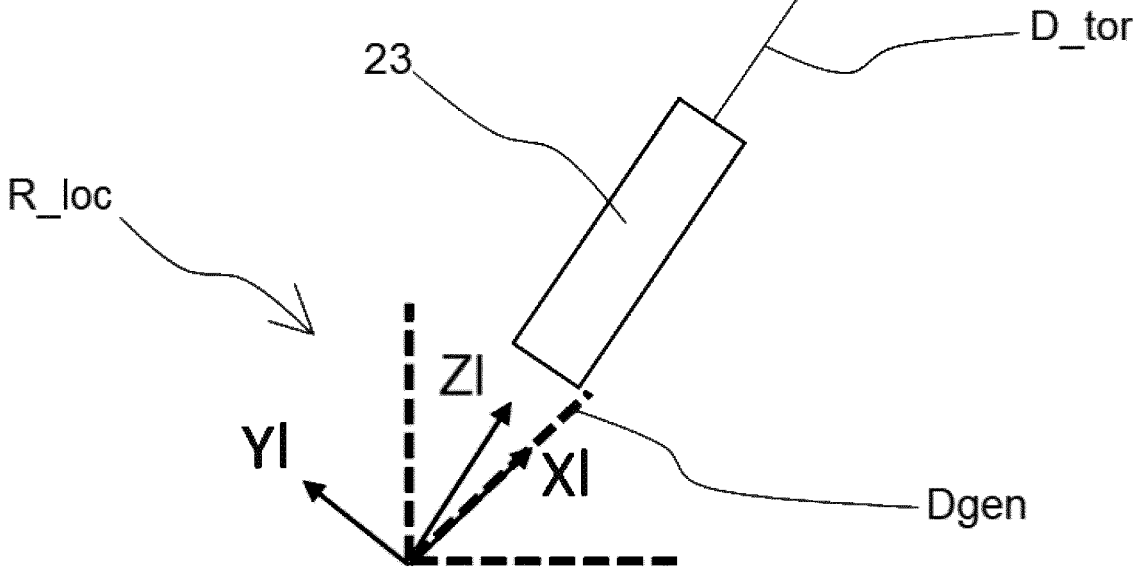
FIG. 5 illustrates the definition of a local coordinate frame used to allow the operator to define flows of movement instructions during a welding phase.

In order for the operator to be able to easily control the welding torch 23 when it is activated in the welding mode described in more detail below, a local coordinate frame R_loc is defined with respect to the general direction of movement Dgen of the welding torch 23, as illustrated by FIG. 5. The definition of the local coordinate frame R_loc makes it possible to facilitate the calculations carried out by the control system 25 during a request for movement of the robotic arm 15 by the operator compared to a mode of implementation in which only the robot coordinate frame would be used. The local coordinate frame R_loc is automatically calculated by the system without any intervention of the operator.

This local coordinate frame R_loc comprises an Xl-axis coinciding with the general direction of movement of the welding torch 23, an Zl-axis corresponding to a projection of an orientation direction D tor of the welding torch 23 in a plane perpendicular to the first Xl-axis, and an Yl-axis perpendicular to the plane defined by the X-axis and the Zl-axis. This local coordinate frame R_loc can evolve along the weld line 13, so that the Xl-axis remains tangent to the weld line 13 in the case of a curved line. Alternatively, the local coordinate frame R_loc can be defined relative to parts 11 and 12 rather than relative to the welding torch 23.

In welding mode, the robotic arm 15 moves the welding torch 23 to the initial point A in a step 107. The operator can however adjust the initial point A if necessary and the local reference R_loc will then be adapted accordingly.

To start the welding, the operator presses a safety button of the MMI 24 which should preferably be held until the end of the welding phase. If the safety button of the MMI is released, the robotic arm 15 and/or the welding generator 22 are stopped.

After pressing the safety button, the welding torch 23 is put into operation in a step 108 so that the heat supply point reaches sufficient heat to produce a weld.

In a step 109, the robotic arm 15 begins to move the welding torch automatically from the welding initial point A in the general direction of movement Dgen. The movement can be started on a specific instruction from the operator through the HMI, or after a fixed or configurable delay.

The operator will be able to check that the welding operation is proceeding correctly using the monitor 31, or visually.

If the operator notices that the trajectory of the welding torch 23 along the general direction of movement Dgen is not suited to the shape of the weld line 13 to be followed, the operator can generate in a step 110 a flow of movement instructions linked to actions of said operator on the man-machine interface 24. This flow of movement instructions aims to move the welding torch 23 away from the general direction of movement Dgen in such a way to adapt in real time a trajectory of the welding torch 23 to a real shape of the weld line 13 between the two parts 11 and 12.

Advantageously, the automatic movement along the local Xl-axis being imposed by the robotic arm 15, the operator can adjust a movement of the welding torch 23 via the man-machine interface 24, only along the local Yl-axis and/or or the local Zl-axis. It should be noted that there is no particular limitation in the movements that the operator can impose on the robotic arm 15 in the Yl/Zl plane. If necessary, the operator can also adapt a speed of movement of the welding torch 23 along the general direction of movement Dgen (i.e. along the Xl-axis) via the man-machine interface 24. The speed of movement is comprised between a minimum value and a maximum value. These values, of the order of a few tens of centimeters per minute, depend on the welding parameters. The welding parameters are defined in particular by the current, the voltage of the welding generator, as well as the wire speed in the case of a welding process with supply of material.

In a complementary and optional manner, it is possible to adjust an angular orientation of the welding torch 23 with respect to the weld line 13.

It is also possible to provide for the establishment of a communication with the welding generator in order to modify the welding parameters from the man-machine interface 24 and to display these welding parameters on the man-machine interface 24.

Figure 6:
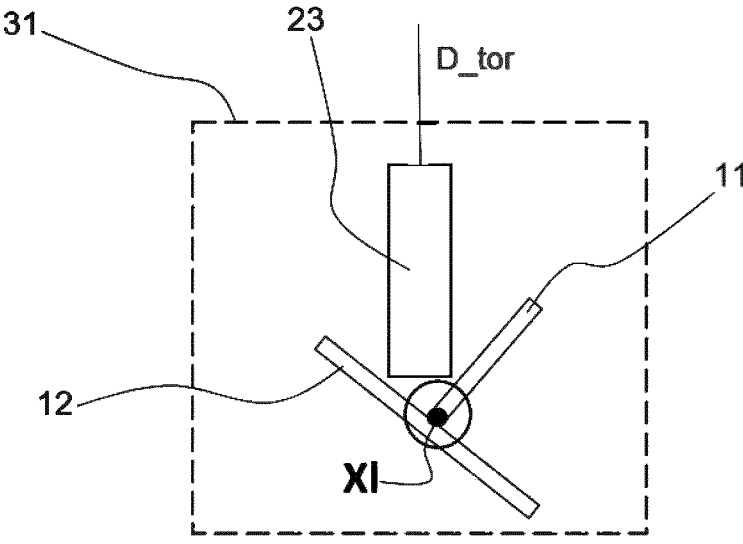
FIG. 6 illustrates the viewing angle of the parts to be welded in the plane of a camera in which the welding torch is oriented in a vertical direction.

Advantageously, in the case where a control camera 30 is used, an axis of the camera 30 coincides with the general direction of movement Dgen so that an image displayed by the monitor 31 is located in the Yl/Zl plane, as shown in FIG. 6. Preferably, the welding torch 23 is directed vertically in the Yl/Zl plane of the image. This facilitates control of the process for the operator who only sees the axis along which he can control a movement of the welding torch 23 to modify the trajectory thereof during the welding operation.

The control system 25 then processes in a step 111 the flow of movement instructions generated by the man-machine interface 24 in order to deduce therefrom a desired speed vector or a desired position in the local coordinate frame R_loc formed by Xl, Yl, Zl axis.

The control system 25 transposes in a step 112 the desired speed vector or the desired position in the coordinate frame Xb, Yb, Zb of the robotic arm 15.

In a step 113, the robotic arm 15 then determines, from coordinates of the desired speed vector or of the desired position, corresponding joint coordinates of the robotic arm 15.

In a step 114, the robotic arm 15 then performs an effective movement of the welding torch 23 according to the previously determined joint coordinates corresponding to the flow of instructions generated by the man-machine interface 24. This step generally uses an automatic control logic.

Advantageously, a latency period between an actuation of the HMI 24 by the operator and an effective movement of the welding torch 23 is less than 450 ms. This reduced latency period makes it possible to obtain a "real time" behavior of the welding assistance method. A duration authorized between two instructions is preferably greater than or equal to the latency duration. However, it is possible to provide for cases where the duration between two instructions is less than the latency duration.

The movement of the robotic arm 15 is stopped in a step 115 when the operator releases the safety button or the welding is finished. The welding torch is then put out in a step 116.

Alternatively, the general direction of movement Dgen is a direction having a shape chosen in particular from: a circle or a portion of a circle, an oval shape or a portion of an oval shape, a polygon, in particular a square or a rectangle, or a portion of polygon, an intersection of two cylinders or a portion of intersection of two cylinders, or any 2D or 3D curve or any other shape.

Figure 7:
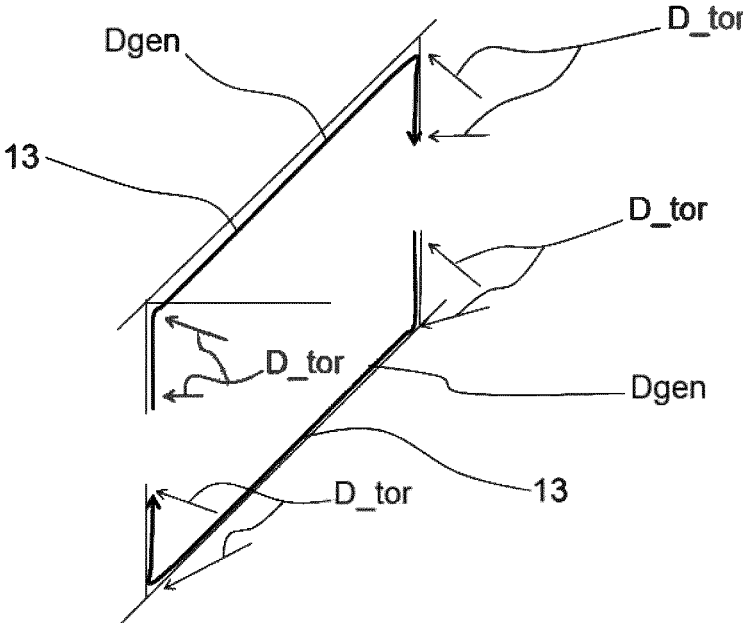
FIG. 7 shows the positions and orientations of a welding torch in the case of making a U-shaped weld line.

In FIG. 7, the positions and orientations D tor of the welding torch 23 are represented in the case of an embodiment of a weld line 13 and of a corresponding general direction of movement Dgen with a U-shape.

Figure 8:
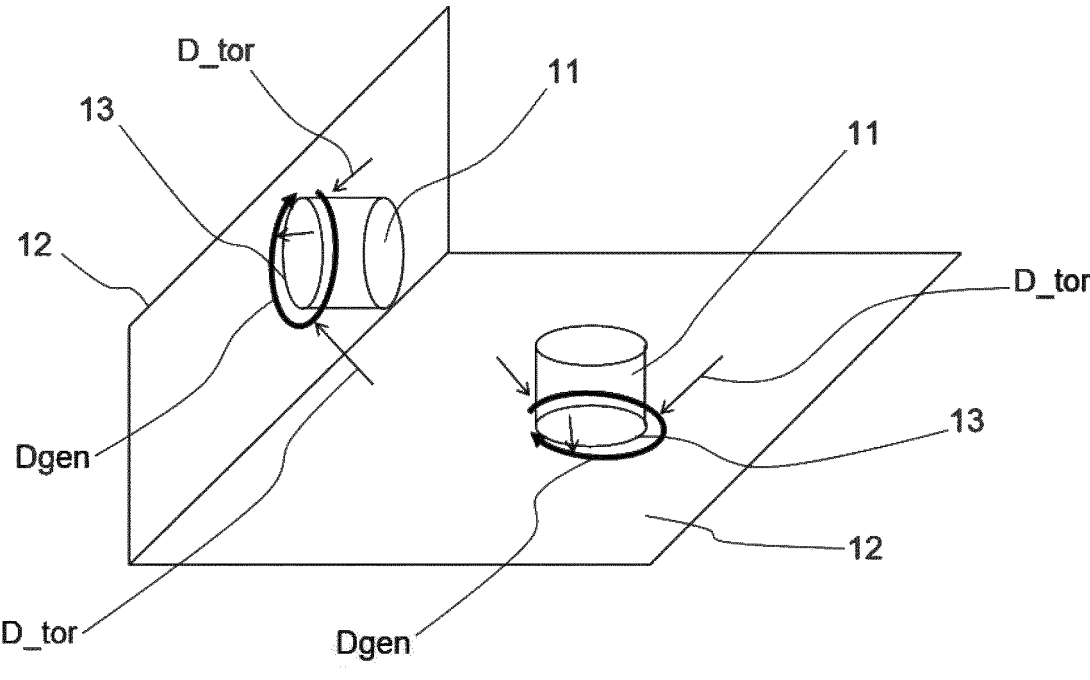
FIG. 8 shows the positions and orientations of a welding torch in the case of carrying out of a circular weld line.

In FIG. 8, the positions and orientations D tor of a welding torch 23 are represented in the case of a production of a weld line 13 and of a corresponding general direction of movement Dgen with a circular shape. Such a weld line 13 corresponds to the intersection between a part 11 to be welded with a cylindrical shape and a part 12 with a planar shape.

Figure 9:
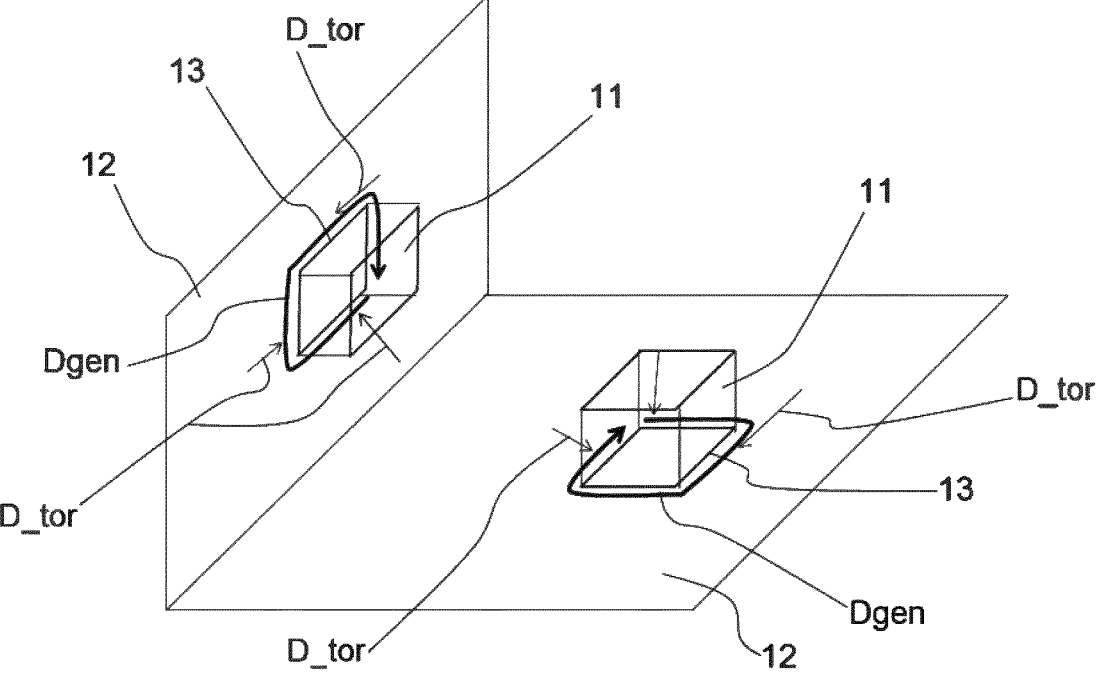
FIG. 9 shows the positions and orientations of a welding torch in the case of carrying out a rectangular weld line.

In FIG. 9, the positions and orientations D tor of a welding torch 23 are represented in the case of a production of a weld line 13 and of a corresponding general direction of movement Dgen with a rectangular shape. Such a weld line 13 corresponds to the intersection between a part 11 to be welded with a parallelepiped shape and a part 12 with a planar shape.

Figure 10:
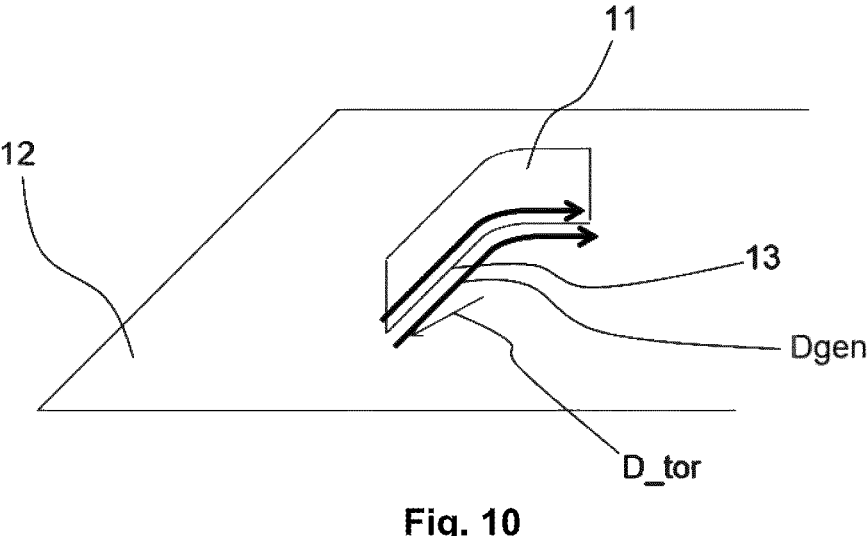
FIG. 10 shows the positions and orientations of a welding torch in the case of carrying out an L-shaped weld line.

In FIG. 10, the positions and orientations of a welding torch 23 are shown in the case of an embodiment of a weld line 13 and a corresponding general direction of movement Dgen with an L-shape.

Figure 11:
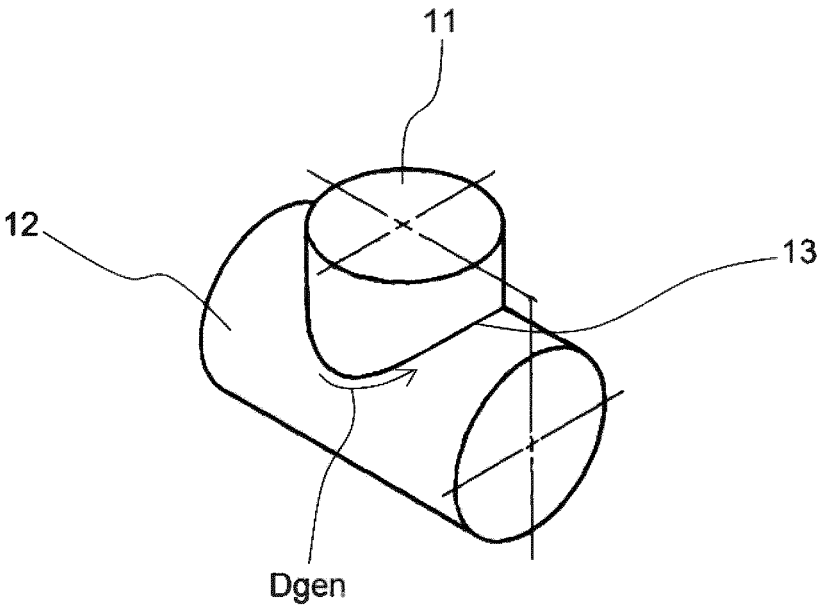
FIG. 11 illustrates the realization of a weld at the intersection of two parts of cylindrical shape.

FIG. 11 illustrates a weld line 13 and a corresponding general direction of movement Dgen corresponding to the intersection of two cylinder-shaped parts 11, 12.

As indicated previously, the operator will be able to select reference points Pref at different places on the weld line 13 so as to be able to determine a general direction of movement Dgen passing through these reference points.

As a variant or in addition, the operator can select reference points on the parts 11, 12 to be welded to deduce the general direction of movement Dgen. For example, the selection of three reference points on a first flat part 11 and the selection of three other reference points on the second flat part 12 make it possible to determine the intersection between the two planes of the parts 11 and 12 corresponding to the general direction of movement Dgen.

Of course, the different features, variants and/or embodiments of the present invention can be associated with each other in various combinations insofar as they are not incompatible or exclusive of each other.

Furthermore, the invention is not limited to the embodiments described previously and provided solely by way of example. It encompasses various modifications, alternative forms and other variants that a person skilled in the art may consider in the context of the present invention and in particular all combinations of the various modes of operation described previously, which may be considered separately or in combination.

The invention claimed is:

1. A welding assistance method between two parts along a weld line using a welding system allowing an operator to carry out welding operations remotely, the welding system comprising:

a robotic device carrying a welding torch, said robotic device being associated with a robot coordinate frame;

a man-machine interface configured to generate movement instructions for moving the robotic device;

a controller configured to receive the movement instructions from the man-machine interface and to control the robotic device according to the movement instructions received via a communication link; and the welding assistance method comprising:

defining, through the operator, reference points on at least one of: the parts to be welded and the weld line to be followed;

defining a general direction of movement of the welding torch from the reference points;

defining a local coordinate frame with respect to the general direction of movement of the welding torch;

automatically moving the welding torch from a welding initial point in the general direction of movement;

generating a flow of movement instructions linked to actions of the operator on the man-machine interface to move the welding torch away from the general direction of movement in order to adapt in real-time a trajectory of the welding torch to a real shape of the weld line;

processing, through the controller, the flow of movement instructions generated by the man-machine interface in order to deduce therefrom a desired speed vector or a desired position in the local coordinate frame; and effectively moving the welding torch corresponding to the desired speed vector or to the desired position in the local coordinate frame.

2. The method of claim 1, wherein to ensure the effective movement of the torch, the method further comprises:

transposing the desired speed vector or the desired position in the robot coordinate frame;

determining, from coordinates of the desired speed vector or of the desired position in the robot coordinate frame, joint coordinates of the robotic device; and effectively moving the welding torch according to the joint coordinates previously determined.

3. The method of claim 1, wherein the general direction of movement is a direction having a shape chosen from: a straight line, a circle or a portion of a circle, an oval shape or a portion of an oval, a polygon or a portion of a polygon, an intersection of two cylinders or an intersection portion of two cylinders, or a 2D or 3D curve.

4. The method of claim 1, wherein following the definition of the welding initial point and a welding end point, and a validation of a trajectory along a return trip, further comprising adjusting the position of the reference points, the welding initial point and the welding end point.

5. The method of claim 1, wherein a latency period between an actuation of the man-machine interface by the operator and an effective movement of the welding torch is less than 450 ms.

6. The method of claim 1, wherein the local coordinate frame comprises an Xl-axis coincident with the general direction of movement of the welding torch, a Zl-axis corresponding to a projection of a direction of orientation of the welding torch in a plane perpendicular to the Xl-axis, and a Yl-axis perpendicular to the plane defined by the Xl-axis and the Zl-axis.

7. The method of claim 6, wherein the welding system further comprises a camera and a monitor to display an image of the weld line and the welding torch captured by the camera; and wherein an axis of the camera coincides with the general direction of movement such that the image displayed by the monitor is situated in the Yl/Zl plane.

8. The method of claim 6, wherein with an automatic movement along the Xl-axis being imposed by the robotic device, the operator can adjust a movement of the welding torch via the man-machine interface, only along at least one of the Yl-axis and the Zl-axis.

9. The method of claim 6, wherein the weld line is a curved weld line, the local coordinate frame evolves along the curved weld line such that the X1-axis remains tangent to the curved weld line.

10. The method of claim 6, further comprising controlling a speed of movement of the welding torch along the X1-axis via the man-machine interface.

11. The method of claim 10, wherein the speed of movement is between a minimum value and a maximum value.

12. The method of claim 1, further comprising adjusting an angular orientation of the welding torch with respect to the weld line.

13. The method of claim 1, wherein the welding system further comprises a camera and a monitor to display an image of the weld line and the welding torch captured by the camera.

14. The method of claim 1, further comprising establishing communication with a welding generator to modify welding parameters from the man-machine interface and to display the welding parameters modified on the man-machine interface.

15. The method of claim 1, wherein a continuous pressing of a safety button of the man-machine interface is imposed during a phase of making a weld by the robotic device.

16. The method of claim 1, wherein a continuous pressing of a safety button of the man-machine interface is imposed during an adjustment phase of defining the reference points.

17. The method of claim 1, wherein the robotic device comprises a plurality of actuators mechanically mounted in series with respect to each other.

18. The method of claim 1, wherein the robotic device comprises a structure made of a lightweight material, the lightweight material being aluminum or a composite material.

19. The method of claim 1, wherein the robotic device comprises a base provided with a removable holder configured to fix the robotic device on or near the parts to be welded.

\* \* \* \* \*